UNITED STATES PATENT OFFICE.

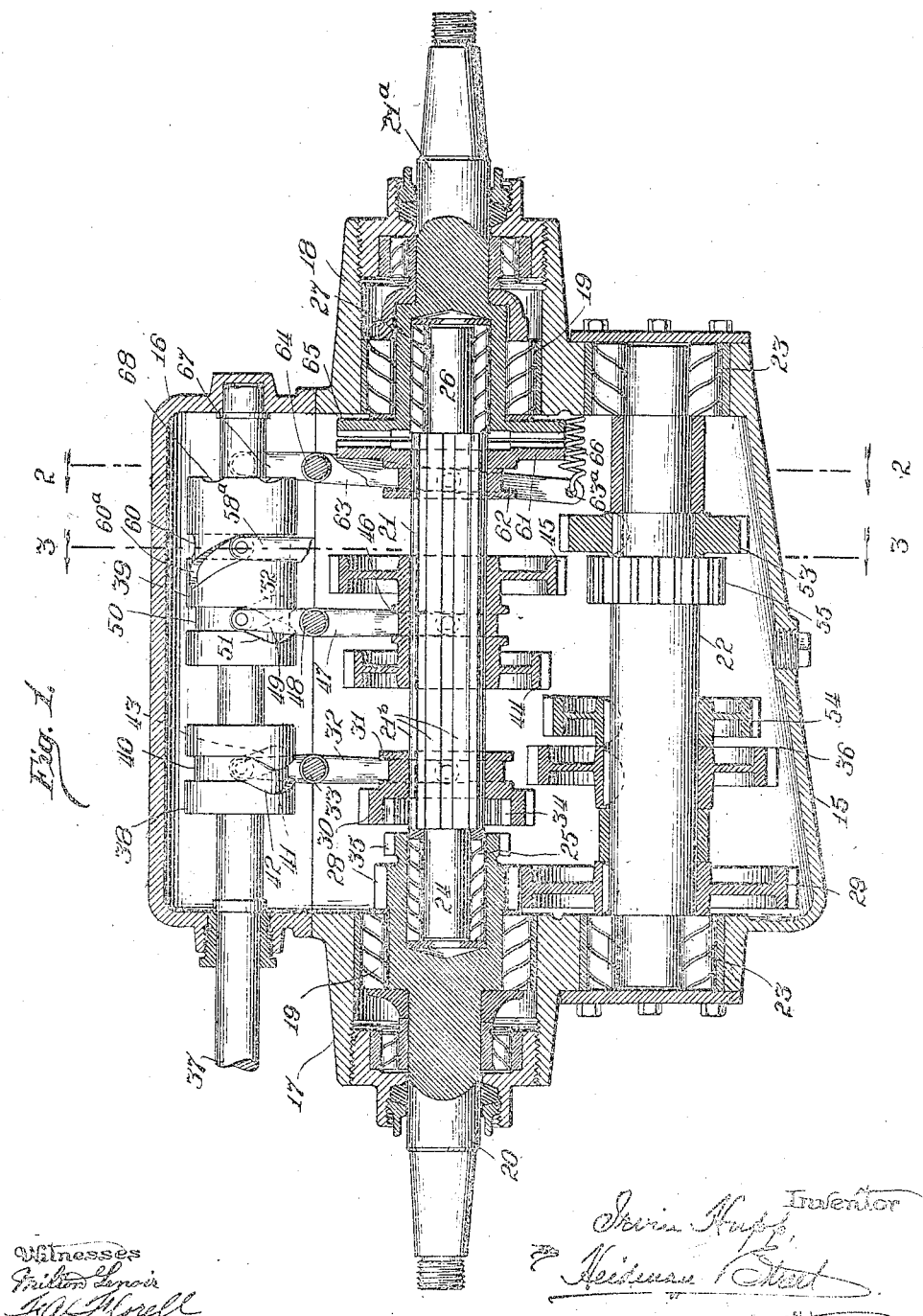

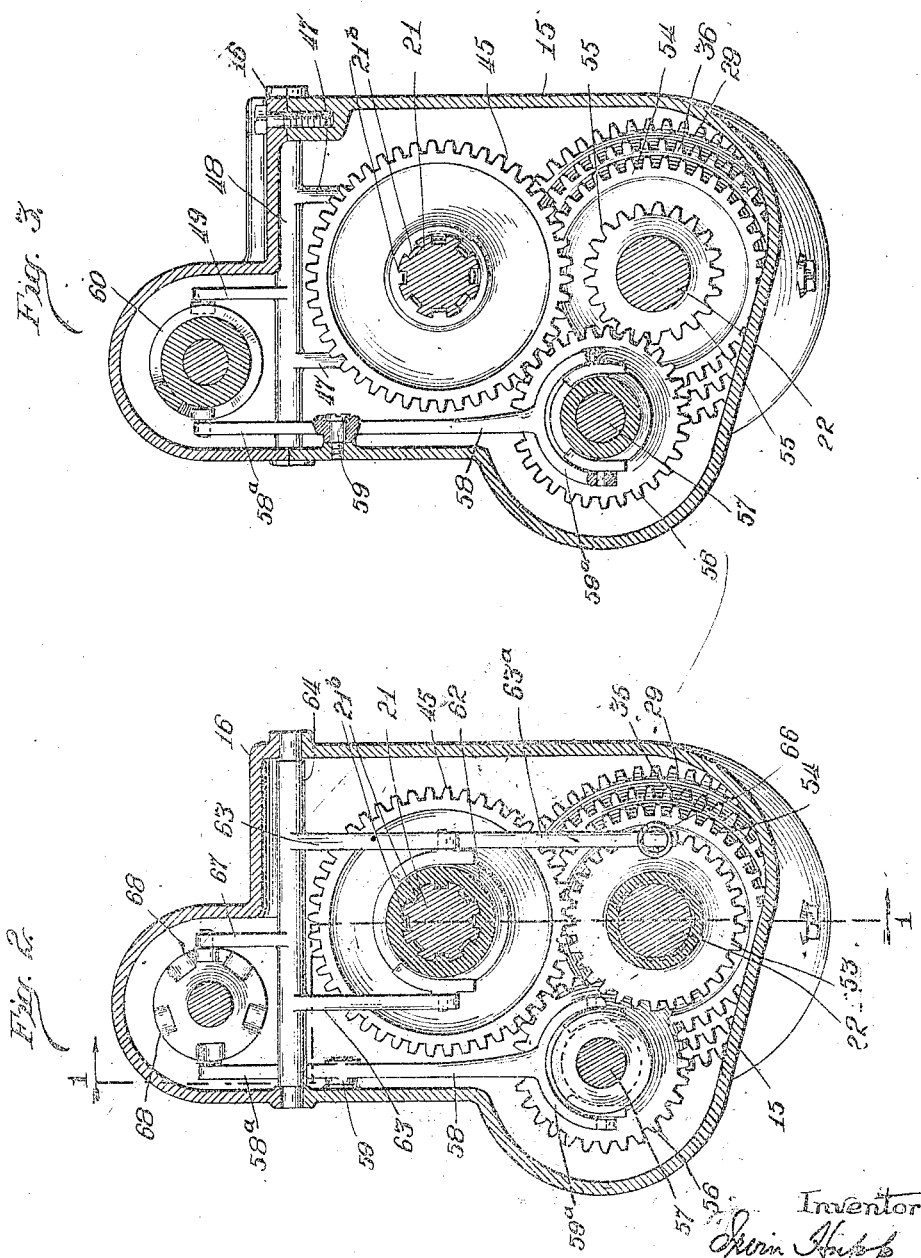

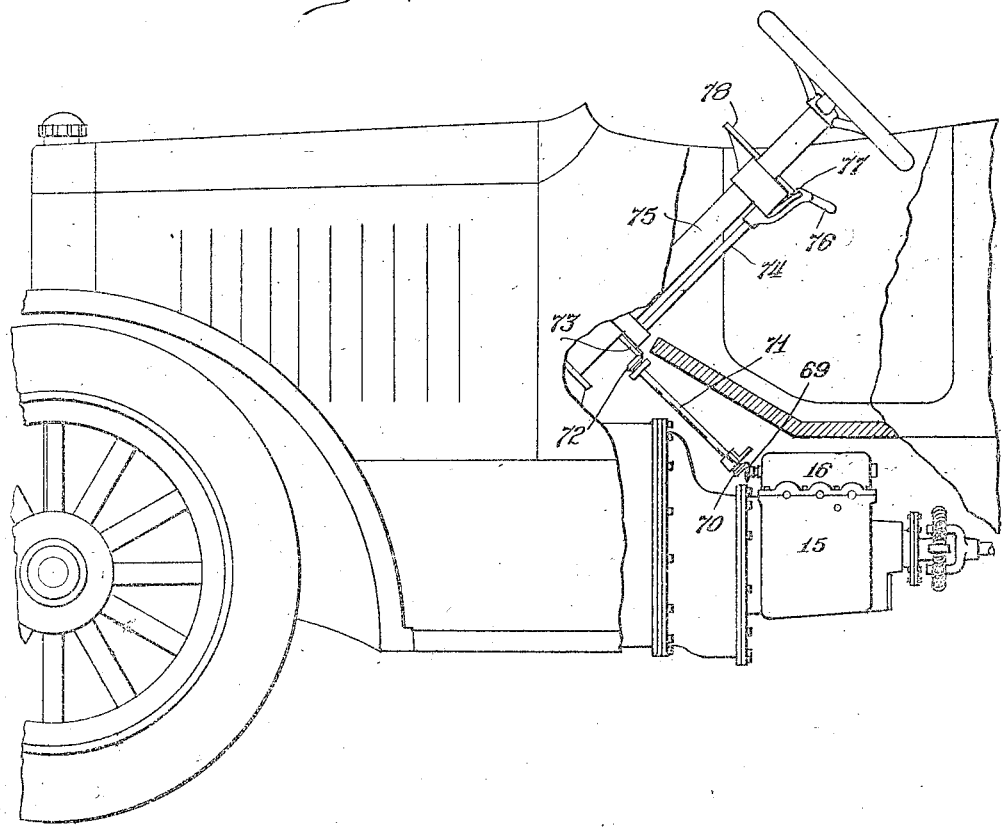

IRVIN HUPP, OF CHICAGO, ILLINOIS.

TRANSMISSION MECHANISM.

1,415,239.  Specification of Letters Patent.  Patented May 9, 1922.

Application filed March 15, 1920. Serial No. 365,850.

*To all whom it may concern:*

Be it known that I, IRVIN HUPP, a citizen of the United States, and a resident of Chicago, in the county of Cook and State of Illinois, have invented certain new and useful Improvements in Transmission Mechanism, of which the following is a description, reference being had to the accompanying drawings, which form a part of my specification.

My invention relates to transmission mechanisms for automobiles, of the sliding-gear type, and has for its object the provision of a simple and efficient change-speed mechanism which shall dispense with the "wabble-stick" shifting lever and connections now generally employed for shifting the gears and enable the gears to be readily shifted for change in speed without any clashing of the gears and resulting noise and damage, and which shall give the driver better control of the car and at the same time lessen both the labor and skill required for its operation; all as hereinafter set forth and particularly pointed out in my claims.

In the accompanying drawings—

Figure 1 represents a longitudinal vertical section through my improved transmission and its enclosing casing.

Figure 2 is a cross sectional view on the line 2—2 of Figure 1.

Figure 3 is a cross sectional view on the line 3—3 of Figure 1.

Figure 4 is a side elevation of part of an automobile showing the application of my invention thereto as well as a method of operation.

The same reference numerals are used to indicate corresponding parts in the several views.

Referring to Figure 1, the various elements of my improved transmission are mounted and enclosed in a suitable casing comprising a lower body portion 15 and a top portion or cap 16 suitably secured thereto. This casing is provided at its opposite ends with axially projecting hub formations 17 and 18, in the former of which is mounted the drive shaft 20 and in the latter of which is mounted the driven shaft 21ª. The bearings for the shafts include suitable anti-friction rollers 19 and 19ª. Interposed between these two shafts, and in axial line therewith, is the splined transmission shaft 21, upon which are mounted the sliding gears of the transmission and the movable member of a rear clutch hereinafter described. The inner or rear end of the drive shaft 20 is counterbored to receive the reduced forward end 24 of the transmission shaft 21, with suitable interposed bearings 25, while the inner or forward end of the driven shaft 21ª is similarly counterbored to receive the reduced rear end 26 of the transmission shaft 21, with suitable interposed bearings 27. Mounted in suitable bearings 23 in the lower part of the casing 15 is the countershaft 22 which carries the fixed or non-sliding gears of the transmission. The largest of these gears 29, secured to the shaft 22 near its left-hand end, is in constant mesh with a pinion 28 secured to or formed upon the inner portion of the drive shaft 20, so that the countershaft is constantly driven by the shaft 20, when the latter is in motion, at a lower rate of speed.

In the transmission illustrated in the accompanying drawings provision is made for four forward speeds and a reverse, to which end there are mounted upon the transmission shaft 21 three sliding gears 30, 44 and 45, adapted to cooperate, respectively, with the three gears 36, 54 and 53 secured upon the countershaft 22, the sliding gear 45 also cooperating with a gear 55 on the shaft 22 through the medium of an intermediate gear 56 (Figure 3) when said intermediate gear is brought into mesh with the gears 45 and 55 for reverse movement, as hereinafter described.

The sliding gear 30 is provided with internal clutch teeth 34 adapted to cooperate with external clutch teeth 35 formed upon the extreme inner or rear end of the drive shaft 20, to connect the latter shaft directly with the transmission shaft 21, for operation at fourth or high speed. When the gear 30 is slid to the right and engaged with the gear 36 the transmission shaft 21 will be driven through gears 28, 29, 36 and 30 at third speed. When the gear 44 is slid to the left and engaged with the gear 54 the transmission shaft will be driven through the gears 28, 29, 54 and 44 at second speed; and when the gear 45 is slid to the right and engaged with the gear 53 the shaft 21 will be driven through the gears 28, 29, 53 and 45 at first or low speed.

The sliding gears are shifted to their several positions for these respective speeds by means of a pair of shifters 32 and 47, mounted upon rock shafts 33 and 48, respectively, and operated by cams on a cam-shaft 37 which, for illustration, is journaled in the upper part of the casing, above and parallel with the transmission shaft 21. The sliding gear 30 is provided with a grooved hub 31 which is engaged on its opposite sides by anti-friction rollers upon the lower ends of the shifter arms 32 depending from the rock shaft 33, while the latter has projecting upwardly from it a single arm 41 which carries at its upper end an anti-friction roller engaging a circumferential groove 40 in a cam-member 38 on the shaft 37, as shown in dotted lines in Figure 1. The groove in the cam-member 38 comprises a truly circumferential portion 40, constituting approximately one-half of the length of the groove, an off-set or cam portion 42 below the same on one side of the cam member 38, and an oppositely off-set or cam portion 43 upon the opposite side of the cam-member. When the upper end of the shifter-arm 41 is engaged with the circumferential portion 40 of the groove the sliding gear 30 will be held in its middle or neutral position shown in Figure 1. When the cam-member 38 is turned to a position to engage the cam portion 42 of the groove with the shifter arm the gear 30 will be slid to the right and engaged with the gear 36 on the countershaft 22 for third speed; and when the cam-member 38 is further turned in the same direction, so as to engage the portion 43 of the groove with the shifter arm, the gear 30 will be slid to the left and its internal clutch teeth 34 engaged with the clutch teeth 35 on the drive shaft, for direct drive.

The sliding gears 44 and 45 are operated by a single shifter, to which end they are carried by a single hub or sleeve provided midway between them with a circumferential groove 46 which is engaged upon its opposite sides by anti-friction rollers carried by the lower ends of two shifter arms 47 depending from the rock shaft 48. Projecting upward from said shaft is an arm 49 carrying at its upper end an anti-friction roller engaging a circumferential groove in a cam-member 39 on the shaft 37. This groove is similar in shape to that in the cam-member 38, comprising a truly circumferential portion 50 and two off-set or cam portions 51 and 52 on opposite sides of the cam-member 39 and below the portion 50 of the groove. When the cam-member 39 is turned in a direction to engage the portion 51 of the groove with the upper end of the arm 49 the gears 44 and 45 will be slid to the right and the gear 45 engaged with the gear 53 on the counter-shaft 22, for first or low speed; and when the cam-member is further turned in the same direction until the offset portion 52 of the groove is engaged with the end of the shifter arm the gears 44 and 45 will be shifted to the left and the gear 44 engaged with the gear 54 on the counter-shaft 22, for second speed.

The shape and position of the groove in the cam-member 39 are, as stated, similar to those of the groove in the cam-member 38, but inasmuch as the shifter arms 41 and 49 are located on opposite sides of the cam-shaft, the arm 41 which cooperates with the groove in the cam-member 38 being located upon the further side of said member in Figure 1, whereas the shifter arm 49 which cooperates with the groove in the cam-member 39 is located upon the near side of the member 39 in said view, the shifter operated by one cam member remains idle or neutral while the other cam member is operating its shifter. Thus, with all of the parts in neutral positon, as shown in Figure 1, if the cam-shaft and cam-members be turned in the direction of the arrow upon the member 38 the shifter 32 which operates the sliding gear 30 will remain idle and unaffected by the turning of the cam-member 38 until the latter has been turned approximately one-half of a revolution, owing to the fact that during such movement of the cam member the upper end of the shifter arm 41 will travel in the truly circumferential portion 40 of the groove in said member. During this half of the revolution of the cam-shaft and cam-members, however, the gears 44 and 45 will be first slid to the right, to engage gear 45 with the gear 53 for first speed, and then to the left to engage the gear 44 with the gear 54, for second speed. Further turning movement of the cam-shaft and cam-members in the same direction will bring the truly circumferential portion 50 of the groove in the member 39 into engagement with the upper end of the shifter arm 49, restoring the gears 44 and 45 to neutral position and holding them in that position while the shifter 41 cooperating with the cam-member 38 is operated by the latter to first shift the sliding gear 30 to the right and engage it with the gear 36, for third speed, and to then shift it to the left and engage its clutch 34 with the clutch 35 on the drive shaft, for direct drive. A return movement of the cam-shaft and cams from such position to the neutral position shown in Figure 1 will, of course, operate to shift the gears to positions for third, second and first speeds, successively.

The shifting of the intermediate gear 56 (Figure 3) for reverse is effected by a shifter arm 58 provided with a forked lower end 59ª carrying shoes engaging a groove in the hub of the gear 56 (Figures 2 and 3), said shifter arm 58 being mounted upon a stud pivot 59 and provided with an upwardly extending portion 58ª carrying an anti-friction roller engaging a second cam-groove 60, 60ª (Figure 1) in the cam-member 39. When the upper end of the arm 58ª is engaged with the truly circumferential portion 60 of said groove, as in Figure 1, the intermediate gear 56 will be held in neutral or idle position, but when the cam-shaft 37 is turned so as to bring the offset or cam portion 60ª of the groove into engagement with the upper end of the arm 58ª the gear 56 will be shifted into engagement with the gears 45 and 55, for reverse, as indicated in Figure 3. As will be noted, during the entire turning movement of the cam-shaft and cams from the neutral position of Figure 1 to the position for direct drive, as heretofore described, the roller on the upper end of the shifter arm 58ª will travel in the truly circumferential portion of the groove 60 in the cam-member 39, leaving the shifter arm 58 and gear 56 at rest, whereas movement of them in the opposite direction from the position of Figure 1 will shift the gear 56 to position for reverse.

The rear end of the cam-member 39 on the shaft 37 is likewise formed, as shown in Figures 1 and 2, to cooperate as a cam with the upper end of an arm 67 fast upon and projecting upwardly from a rock-shaft 64 and comprising part of a clutch-shifter, the remainder of which consists of two arms 63 depending from the rock-shaft 64 and carrying upon opposite sides of the transmission shaft 21 a pair of shoes which engage the grooved hub 62 of a clutch member 61 splined upon the shaft 21 and provided upon its rear face with clutch teeth adapted to engage corresponding clutch teeth upon the forward face of a similar clutch member 65 carried by or formed integral with the inner end of the driven shaft 21ª. One of the shifter arms 63 is provided with an extension 63ª projecting some distance below the hub of the clutch member 61, and having connected to its lower end one end of a strong coiled spring 66 whose opposite end is secured to a suitable fixed point on the casing. This spring tends to pull the lower end of the shifter arm to the right and engage the clutch member 61 with the clutch member 65, and thereby connect the transmission shaft 21 with the driven shaft 21ª, but this movement of the clutch member 61 and engagement of the clutch is permitted only when the shaft 37 and cam-member 38 are turned to such position as to bring one or another of recesses 68 in the end of the cam-member 39 opposite the anti-friction roller carried by the upper end of the shifter arm 67. When this occurs the spring 66 is permitted to pull the lower end of the shifter to the right and engage the clutch members, but the moment the shaft 37 and cam-member 39 are turned from any such position, and the upper end of the shifter arm 67 thereby forced to the right, as in Figure 1, the clutch member 61 will be disengaged from the member 65 and the transmission shaft 21 thereby disconnected from the driven shaft 21ª. The positions of the recesses 68 in the end of the cam-member 39, and their relation to the cam grooves in said member and in the member 38, are such that in all neutral and intermediate positions of the sliding gears of the transmission the roller upon the upper end of the shifter arm 67 will be engaged with one of the surfaces of the cam-member 39 between the recesses 68, and the clutch member 61 be consequently held out of engagement with the clutch member 65, with the transmission shaft 21 disconnected from the driven shaft 21ª; but whenever any one of the sliding gears is brought into active position, by complete engagement with one of the gears upon the countershaft 22, or by complete engagement of the internal clutch of the gear 30 with the clutch teeth 35 on the drive shaft 20, one of the recesses 68 will be brought opposite the upper end of the shifter arm 67 and the spring 66 thereby permitted to engage the clutch members 61 and 65 and connect the transmission shaft (and consequently the drive shaft) with the driven shaft 21ª.

As will be understood from the foregoing, the first thing that occurs, when the cam-shaft and cams are turned to shift the gears from one active position to another, is the forcing of the upper end of the shifter arm 67 out of the recess 68 with which it has been engaged, and the consequent opening of the clutch 61—65 and disconnection of the transmission shaft 21 from the driven shaft 21ª; during the further turning movement of the cam-shaft and cams, and shifting of the gears to another active position, the roller upon the upper end of the shifter arm 67 will travel upon the plane surface between two adjacent recesses 68, and be held in right-hand position, with the clutch members 61—65 out of engagement with each other; and when such shifting of the gears to their new position is completed and the gears fully engaged for the changed speed, another recess 68 in the cam member 39 will be brought opposite the upper end of the shifter arm 67 and the spring 66 be permitted to then re-engage the clutch members 61—65 and re-connect the transmission shaft 21 with the driven shaft 21ª. Inasmuch as the drive shaft 20 (and consequently the transmission shaft 21) will be disconnected from the engine shaft during any such shifting of the gears, by the opening of the usual forward clutch interposed between the engine shaft and the shaft 20, the transmission shaft will be left entirely free from load, with the result that the shifting of the gears on said shaft and their engagement with the gears upon the countershaft may be smoothly and readily effected, without any clashing of the gears and resulting noise and damage. The shifting from one speed to another, in either direction, or a shifting through a range of several speeds in either direction, may be readily and smoothly effected while the car is traveling at considerable speed, and the shifting from higher to lower speed may be advantageously employed for braking purposes.

The cam-shaft 37 may be turned, to shift the gears in the manner described, by any suitable means within reach of the driver at the steering wheel. I have shown one suitable provision for the purpose in Figure 4 of the drawings, where it will be seen that the cam-shaft 37 carries upon its end projecting from the casing 16 a bevel gear 69 meshing with a bevel gear 70 upon the rear end of a shaft 71 suitably mounted in bearings upon the machine, and carrying at its upper forward end a bevel gear 72 meshing with a similar gear 73 carried by the lower forward end of a shaft 74 mounted at its upper and lower ends in bearings carried by the steering post 75. Secured to the shaft 74 immediately beneath its upper bearings is an operating handle 76 provided with an index or pointer 77 to cooperate with suitable indications of the several shift positions upon the face of a sector 78 carried by the upper bearing of the shaft 74, and also provided with a spring detent to engage correspondingly located notches in the edge of such sector. By swinging the handle 76 around the sector 78 the cam-shaft 37 may be turned to various desired positions, and releasably held in any one of such positions by the engagement of the spring detent with the corresponding notch in the edge of the sector 78. Any other suitable provision for turning the cam-shaft to its several positions, and releasably holding it therein, may manifestly be employed.

While I have shown and described what I believe to be the simplest embodiment of my invention, modifications may be made in certain respects, without, however, departing from the spirit of my invention; for example the cam-shaft 37 need not necessarily be disposed in a horizontal plane above the driven-shaft, but may be arranged in a different plane; and the counter-shaft need not be disposed in a plane below that of the driven shaft; it being essential merely to so dispose the various shafts that proper operation of the various correlated elements is possible; while at the same time different operating means from that disclosed in Figure 4 may be employed for giving the desired rotation to cam-shaft 37.

What I claim is:—

1. Transmission mechanism of the class described, comprising, a casing, a power-shaft rotatably mounted in one end wall of said casing, a driven-shaft rotatably mounted in the opposite end wall of the casing, a transmission shaft, the inner end of the power-shaft being socketed to receive one end of the transmission shaft, while the inner end of the driven-shaft is socketed to receive the end of the transmission shaft, anti-friction bearings arranged in the end walls of the casings and in said socketed ends for the ends of the respective shafts, a counter-shaft mounted in said casing parallel with the other shafts, a plurality of gears arranged on the power-shaft, the counter-shaft and the transmission shaft, with the gears on the power-shaft and counter-shaft being fixedly secured thereto and arranged in constant meshing relation, while the gears on the transmission shaft are slidably mounted thereon so as to permit them to be shifted into meshing relation with the gears on the power-shaft and the gears on the counter-shaft, oscillatingly mounted elements for controlling the slidably mounted gears on the transmission shaft, a pair of clutch members arranged on the transmission shaft and the driven-shaft, with the clutch member on the transmission shaft made slidable, a spring-controlled element for normally moving the slidable clutch member into clutching relation with the fixedly mounted clutch member, a slidably mounted idler arranged in said casing and adapted to be moved into meshing relation with a gear on the counter-shaft and a gear on the transmission shaft, an oscillatingly mounted element for controlling said idler, and a rotatable shaft arranged in said housing and provided with a plurality of actuating surfaces at predetermined points about its perimeter whereby one of said oscillatingly mounted elements and said spring-controlled element will be jointly actuated during different degrees of rotation of said rotatable shaft, the desired speed ratio thereby produced and clutching relation between the clutch members permitted.

2. Transmission mechanism, comprising, in combination with a power-shaft, a transmission shaft, a driven-shaft and a counter-shaft, a plurality of gears on the power-shaft, the counter-shaft and the transmission shaft, a slidably mounted idler adapted to be moved into meshing relation with a gear on the counter-shaft and a gear on the transmission shaft so as to provide reverse operation of the latter, some of the gears being slidably mounted, a clutch between the transmission shaft and the driven-shaft, a plurality of members for controlling the slidably mounted gears, said idler and the clutch, and a rotatable shaft common to all of said members whereby different gear-controlling members, in conjunction with the clutch-controlling member, are jointly actuated at predetermined periods in the rotation of said shaft.

3. Transmission mechanism, comprising, in combination with a power-shaft, a driven shaft and an aligned transmission shaft, the adjacent ends of the power-shaft and transmission shaft and adjacent ends of the transmission shaft and the driven-shaft being arranged in telescopic relation, a counter-shaft disposed parallel with both shafts, a plurality of gears mounted on the power shaft, the transmission shaft and the counter-shaft, with some of the gears being loosely mounted, clutch members between the transmission shaft and the driven-shaft, means whereby operative relation between the gears and between the clutch members may be effected, and a rotatable member provided with a plurality of actuating surfaces whereby preselected portions of said means will be actuated at predetermined periods in the rotation of said member.

4. Transmission mechanism, comprising, in combination with a power-shaft, a driven shaft and an aligned transmission shaft, the adjacent ends of the power-shaft and transmission shaft and the adjacent ends of the transmission shaft and the driven-shaft being arranged in telescopic relation, a counter-shaft disposed parallel with both shafts, a plurality of gears mounted on the power shaft, transmission shaft and counter-shaft, with some of the gears being loosely mounted, a loosely mounted idler gear adapted to be brought into meshing relation with a gear on the counter-shaft and a gear on the transmission shaft, clutch members between the transmission shaft and the driven-shaft, means whereby operative relation between the gears, between the idler gear and some of said gears and between the clutch members may be effected, and a rotatable member provided with a plurality of actuating surfaces whereby pre-selected portions of said means will be actuated at predetermined periods in the rotation of said member.

5. Transmission mechanism, comprising, in combination with a power-shaft, a transmission shaft, a driven-shaft and a counter-shaft, a plurality of gears mounted on the power shaft, transmission shaft and the counter-shaft, the gears on the transmission-shaft being slidably feathered thereon and arranged to move into intermeshing relation with the gears on the counter-shaft, with one gear on the transmission-shaft being also adapted to directly couple the transmission-shaft to the power-shaft, an idler gear adapted to be moved into intermeshing relation with a gear on the counter-shaft and a gear on the transmission-shaft whereby reverse rotation of the transmission-shaft is induced, a plurality of oscillatingly mounted members for controlling the slidably feathered gears on the transmission-shaft and said idler gear, and a rotatable member provided with circumferentially disposed slots provided with off-sets at different points relative to said oscillatingly mounted members, each slot being adapted to control one of the oscillatingly mounted members, whereby different speed ratios are obtained at different periods in the rotation of said rotatable member.

6. Transmission mechanism, comprising, in combination with a power-shaft, a driven-shaft, a transmission-shaft aligned therewith, and a counter-shaft, clutch members mounted on the transmission-shaft and on the driven-shaft for effecting operative relation between the shafts, a plurality of gears mounted on the power shaft, transmission-shaft and the counter-shaft, the gears and clutch member on the transmission-shaft being slidably feathered thereon, with one of said last mentioned gears being also adapted to directly couple the transmission-shaft to the power-shaft, an idler gear adapted to be moved into intermeshing relation with a gear on the counter-shaft and a gear on the transmission-shaft for providing reverse rotation of the transmission-shaft, a plurality of members for controlling the slidably feathered gears and clutch member on the transmission-shaft and said idler gear, and a rotatable member provided with a plurality of cam-acting surfaces circumferentially disposed at different points relative to said second mentioned members, with each surface adapted to control one of said second mentioned members, whereby different speed ratios and operative relation between the transmission-shaft and the driven-shaft are obtained at different periods in the rotation of said rotatable member.

7. Transmission mechanism, comprising, in combination with a power-shaft, a transmission-shaft, a driven-shaft, and a counter-shaft, clutch members mounted on the transmission-shaft and the driven-shaft for effecting operative relation therebetween, a plurality of gears mounted on the power-shaft, transmission-shaft and the counter-shaft, the gears and clutch member on the transmission-shaft being slidably feathered thereon, with one of said gears adapted to directly couple the transmission-shaft to the power-shaft, an idler gear adapted to be moved into intermeshing relation with a gear on the counter-shaft and a gear on the transmission-shaft for providing reverse rotation of the latter, a plurality of oscillatingly mounted members for controlling the slidable gears and clutch member on the transmission-shaft and said idler gear, a rotatable member provided with a plurality of off-sets disposed at predetermined points circumferentially about the member and adapted to control the second mentioned members so as to provide different speed ratios and operative relation between the transmission-shaft and the driven-shaft at different periods in the rotation of said rotatable member, and means whereby rotation of said last member in the desired direction and to the desired degree may be effected.

8. In a transmission mechanism, the combination of a transmission shaft and a driven shaft, a clutch interposed between said shafts, a counter-shaft, co-operating transmission gears mounted upon the transmission shaft and upon the counter-shaft, respectively, and selectively engageable with each other for different speeds, means for shifting certain of the transmission gears, and means for automatically opening the clutch as an incident to the shifting of said gears.

9. In a transmission mechanism, the combination of a transmission shaft and a driven shaft, a clutch interposed between said shafts, a counter-shaft, co-operating transmission gears mounted upon the transmission shaft and upon the counter-shaft, respectively, and selectively engageable with each other for different speeds, means for shifting certain of said transmission gears, and means for automatically opening the clutch at the beginning of the shifting of said gears, maintaining it open during their shifting movement, and automatically closing it at the end of such movement.

10. In a transmission mechanism, the combination of a transmission shaft and a driven-shaft, a clutch interposed between said shafts, a counter-shaft, co-operating transmission gears mounted upon the transmission shaft and upon the counter-shaft, respectively, and selectively engageable with each other for different speeds, a plurality of rotary cams, and a plurality of shifters interposed between said cams, on the one hand, and certain of the transmission gears and the movable member of the clutch, on the other hand, for selectively shifting the transmission gears and automatically opening the clutch as an incident to said shifting of the gears.

11. In a transmission mechanism, the combination of a transmission shaft and a driven shaft, a clutch interposed between said shafts, a counter-shaft, cooperating transmission gears mounted upon the transmission shaft and upon the counter-shaft, respectively, and selectively engageable with each other for different speeds, a plurality of rotary cams, and a plurality of shifters interposed between said cams, on the one hand, and certain of the transmission gears and the movable member of the clutch, on the other hand, for selectively shifting the transmission gears and for automatically opening the clutch at the beginning of such shifting movement, maintaining it open during the shifting movement, and automatically closing it at the end thereof.

12. In a transmission mechanism, the combination of a transmission shaft and a driven shaft, a clutch interposed between said shafts, a counter-shaft, cooperating transmission gears mounted upon the transmission shaft and upon the counter-shaft, respectively, and selectively engageable with each other for different speeds, means for opening and closing the clutch, and means for selectively shifting the transmission gears when, and only when, the clutch is open and the two shafts thereby disconnected from each other.

13. In a transmission mechanism, the combination of a transmission shaft and a driven shaft, a clutch interposed between said shafts, a counter-shaft, co-operating transmission gears mounted upon the transmission shaft and upon the counter-shaft, respectively, and selectively engageable with each other for different speeds, and a manually operable device located within reach of the driver at the steering wheel and operatively connected with the movable member of the clutch and certain of the transmission gears for shifting said gears and opening the clutch.

14. In a transmission mechanism, the combination of a transmission shaft and a driven shaft, a clutch interposed between said shafts, a counter-shaft, co-operating transmission gears mounted upon the transmission shaft and upon the counter-shaft, respectively, and selectively engageable with each other for different speeds, a rotary cam shaft, a plurality of cams thereon, shifters interposed between said cams, on the one hand, and certain of the transmission gears and the movable member of the clutch, on the other hand, for shifting said gears and opening the clutch, and a manually operable device located within reach of the driver at the steering wheel and geared to the cam shaft for operating the same.

15. In a transmission mechanism, the combination of a drive shaft, a driven-shaft and an intermediate transmission shaft, a clutch interposed between the transmission shaft and the driven shaft, a counter-shaft permanently geared to the drive-shaft, gears mounted in fixed position upon said counter-shaft, sliding gears mounted on the transmission shaft to turn therewith, and means for selectively shifting said sliding gears into and out of engagement with the gears upon the counter-shaft and for automatically opening the clutch between the transmission shaft and the driven-shaft as an incident to the shifting of said gears.

16. In a transmission mechanism, the combination of a drive shaft, a driven-shaft and an intermediate transmission shaft, a clutch interposed between the drive shaft and the transmission shaft and a second clutch interposed between the transmission shaft and the driven-shaft, a countershaft permanently geared to the drive shaft, gears mounted in fixed position upon said counter-shaft, sliding gears mounted on the transmission shaft to turn therewith, means for opening and closing the clutch between the drive shaft and the transmission shaft and for selectively shifting the sliding gears upon the transmission shaft into and out of engagement with the gears upon the counter-shaft, and means for automatically opening the clutch between the transmission shaft and the driven-shaft as an incident to the shifting of the gears.

17. In a transmission mechanism, the combination of a drive shaft, a driven-shaft and an intermediate transmission shaft, a clutch interposed between the drive shaft and the transmission shaft and a second clutch interposed between the transmission shaft and the driven-shaft, a counter-shaft permanently geared to the drive shaft, gears mounted in fixed position upon said counter-shaft, sliding gears mounted on the transmission shaft to turn therewith, a plurality of shifter-operating cams, and shifters interposed between said cams and the sliding gears and the movable member of the clutch between the transmission shaft and the driven shaft, for selectively shifting the sliding gears into and out of engagement with the gears upon the counter-shaft and automatically opening the clutch between the transmission shaft and the driven shaft as an incident to the shifting of said gears.

18. In a transmission mechanism, the combination of a drive shaft, a driven-shaft and an intermediate transmission shaft, a clutch interposed between the drive shaft and the transmission shaft and a second clutch interposed between the transmission shaft and the driven shaft, a counter-shaft permanently geared to the drive shaft, gears mounted in fixed position upon said counter shaft, sliding gears mounted on the transmission shaft to turn therewith, a cam shaft, a plurality of cams thereon, shifters interposed between said cams, on the one hand, and the sliding gears of the transmission and the movable members of the clutches, on the other hand, for shifting the sliding gears and opening and closing the clutches, and a manually operable device located within reach of the driver at the steering wheel and geared to the cam shaft for operating the same.

19. In a transmission mechanism, the combination of a drive-shaft, a driven-shaft, a transmission shaft arranged intermediate of said shafts, a counter-shaft arranged parallel with said shafts, transmission gears on the drive shaft, transmission shaft and the counter-shaft, cooperating gears on the drive shaft, transmission shaft and the counter-shaft, with the gears on the transmission shaft being slidable into and out of cooperating position, a clutch between the transmission shaft and the driven shaft, one member of the clutch being slidable, a movably mounted idler gear adapted to cooperate with gears on the counter-shaft and the transmission shaft, a plurality of elements for moving the gears on the transmission shaft, the slidable clutch member and said idler gear, and a single rotatable member provided with cam surfaces whereby the clutch member is shifted out of operative position and the predetermined gear on the transmission shaft is moved to operative position when said single member is rotated in one direction and said clutch member shifted into inoperative position and the idler gear moved to operative position when said single member is rotated in the opposite direction.

20. Transmission mechanism, comprising, in combination with a drive shaft, a driven-shaft, a transmission shaft aligned therewith, and a counter-shaft, clutch members mounted on the transmission shaft and the driven-shaft for effecting operative relation therebetween, a plurality of gears mounted on the drive shaft, the transmission shaft and the counter-shaft, the gears and clutch member on the transmission shaft being slidably feathered thereon, with one of said last mentioned gears also adapted to directly couple the transmission shaft to the drive shaft, a plurality of members for controlling the slidably feathered gears and said clutch member on the transmission shaft, and a rotatable member provided with cam surfaces disposed circumferentially thereabout at different points relative to said plurality of members, with each cam surface adapted to control one of said last mentioned members whereby, at different periods in the rotation of said rotatable member, the clutch members are separated and a slidable gear is shifted.

21. Transmission mechanism of the character described, comprising a drive shaft, a driven-shaft, a transmission shaft disposed intermediate of the drive shaft and driven-shaft with the ends thereof journaled in said shafts, a counter-shaft disposed parallel with said shafts, a clutch intermediate of the transmission shaft and driven-shaft with one of the clutch members made slidable and normally held in clutching position, gears arranged on the drive shaft, transmission shaft and counter-shaft, with the gears on the transmission shaft being slidable thereon, an idler gear adapted to be brought into mesh with a gear on the transmission shaft and a gear on the counter-shaft, shifter elements yieldingly mounted and arranged in controlling relation with the slidable gears, idler gear and slidable clutch member, and a rotatable shaft provided with cam recesses disposed in a circumferential manner thereabout, each recess being adapted to operatively engage with a shifter element, whereby a predetermined shifter element will be moved at a prearranged moment in the rotation of said shaft and declutching of said clutch induced momentarily in advance of movement of the slidable gears and said idler gear.

22. Transmission mechanism of the character described, comprising a drive shaft, a driven-shaft, a transmission shaft loosely mounted in the ends of the drive shaft and the driven-shaft, a counter-shaft disposed parallel with said shafts, a clutch intermediate of the transmission shaft and the driven-shaft for operatively connecting said shafts, one portion of said clutch being slidably mounted and normally held in clutching position, gears on the end of the drive shaft, on the transmission shaft and on the counter-shaft, with the gears on the transmission shaft being loosely mounted thereon while those on the other shafts are non-shiftable, a gear on the drive shaft and a gear on the adjacent end of the counter-shaft being in constant mesh, while one of the gears on the transmission shaft is adapted to couple the transmission shaft to said drive shaft, an idler gear adapted to be moved into mesh with a gear on the transmission shaft and a gear on the counter-shaft, shifter elements for the loosely mounted gears and the slidably mounted portion of said clutch whereby said gears and clutch portion are controlled, and a rotatable member, common to all of said shifter elements, provided with a plurality of cam recesses disposed circumferentially thereabout and each adapted to actuate a single shifter element at a different moment in the rotation of said rotatable member whereby said movable clutch portion is forced into non-clutching position momentarily in advance of movement of the loosely mounted gears.

23. Transmission mechanism, comprising a drive shaft, a transmission shaft, a driven-shaft, clutch mechanism intermediate of the transmission shaft and the driven-shaft, power-transmitting elements intermediate of the drive-shaft and the driven-shaft whereby the last mentioned shaft may be driven at various speeds, and a single operating member for said clutch mechanism and all of said elements, arranged to actuate said clutch mechanism at a predetermined moment relative to its actuation of the preselected power-transmitting element.

24. Transmission mechanism, comprising a drive-shaft, a transmission shaft, a driven-shaft, a clutch mechanism intermediate of the driven-shaft and the transmission shaft, power-transmitting means intermediate of the drive-shaft and the transmission shaft whereby the latter may be driven at various speeds, a single operating member for said clutch mechanism and all of said elements, and means whereby said member may be given predetermined movement to actuate said clutch mechanism and effect operative relation between the shafts through the selective power-transmitting means.

IRVIN HUPP.

Witnesses:
F. A. FLORELL,
G. HEIDMAN.